US008667015B2

(12) United States Patent
Jiao et al.

(10) Patent No.: US 8,667,015 B2
(45) Date of Patent: Mar. 4, 2014

(54) DATA EXTRACTION METHOD, COMPUTER PROGRAM PRODUCT AND SYSTEM

(75) Inventors: Li-Mei Jiao, Beijing (CN); Yuhong Xiong, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/258,480

(22) PCT Filed: Nov. 25, 2009

(86) PCT No.: PCT/CN2009/075117
§ 371 (c)(1),
(2), (4) Date: Sep. 22, 2011

(87) PCT Pub. No.: WO2011/063561
PCT Pub. Date: Jun. 3, 2011

(65) Prior Publication Data
US 2012/0059859 A1    Mar. 8, 2012

(51) Int. Cl.
*G06F 17/30* (2006.01)
(52) U.S. Cl.
USPC ........... 707/780; 707/758; 707/791; 715/234; 706/11; 706/12; 706/14
(58) Field of Classification Search
None
See application file for complete search history.

(56) References Cited

U.S. PATENT DOCUMENTS

| | | | | |
|---|---|---|---|---|
| 6,502,112 | B1 * | 12/2002 | Baisley | 715/210 |
| 6,560,620 | B1 * | 5/2003 | Ching | 715/229 |
| 6,848,078 | B1 * | 1/2005 | Birsan et al. | 715/206 |
| 7,403,951 | B2 * | 7/2008 | Setlur et al. | 1/1 |
| 7,539,657 | B1 * | 5/2009 | Liu et al. | 706/45 |
| 7,765,236 | B2 * | 7/2010 | Zhai et al. | 707/797 |
| 7,877,399 | B2 * | 1/2011 | Lwo | 707/758 |
| 2003/0195890 | A1 * | 10/2003 | Oommen | 707/100 |
| 2004/0103124 | A1 * | 5/2004 | Kupkova | 707/203 |
| 2004/0205454 | A1 * | 10/2004 | Gansky et al. | 715/500 |
| 2005/0039117 | A1 * | 2/2005 | Lwo | 715/513 |
| 2006/0294120 | A1 * | 12/2006 | Li et al. | 707/100 |
| 2008/0005663 | A1 * | 1/2008 | Fujimaki et al. | 715/513 |
| 2008/0046441 | A1 * | 2/2008 | Wen et al. | 707/100 |
| 2008/0072140 | A1 * | 3/2008 | Vydiswaran et al. | 715/243 |
| 2008/0126396 | A1 * | 5/2008 | Gagnon | 707/102 |

(Continued)

OTHER PUBLICATIONS

Arasu et al, "Extracting Structured Data from Web Pages", ACM, 2003.*
Gupta et al, "Automating Content Extraction of HTML Documents", 2004.*
Reis et al, "Automatic Web News Extraction Using Tree Edit Distance", ACM, 2004.*

(Continued)

Primary Examiner — Hung Le

(57) ABSTRACT

Disclosed is a method of automatically extracting data from a target web page, comprising selecting (302) data in a source web page; determining (304) the respective DOM (document object model) trees of the source and target web page, and identifying the one or more nodes comprising the selected data in the source web page DOM tree; determining (306) matching paths in the respective DOM trees; for selected data in a node of an unmatched branch of the source web page DOM tree, identifying (308) the nearest matched path in the source web page; identifying (310) the unmatched branch nearest to the corresponding matched path in the target web page; determining (312) if said identified unmatched branch in the target web page DOM tree comprises a target node matching the selected data node; and if so: extracting (322) data from the target node if the mismatch between the respective unmatched branches does not exceed a predefined threshold. A computer program product and system implementing this method are also disclosed.

14 Claims, 3 Drawing Sheets

(56) References Cited

U.S. PATENT DOCUMENTS

| | | | |
|---|---|---|---|
| 2009/0049062 A1* | 2/2009 | Chitrapura et al. | 707/100 |
| 2009/0063500 A1 | 3/2009 | Zhai et al. | |
| 2009/0125529 A1* | 5/2009 | Vydiswaran et al. | 707/100 |
| 2010/0083095 A1* | 4/2010 | Nikovski et al. | 715/234 |
| 2010/0169311 A1* | 7/2010 | Tengli et al. | 707/736 |
| 2010/0313149 A1* | 12/2010 | Zhang et al. | 715/760 |
| 2010/0318892 A1* | 12/2010 | Teevan et al. | 715/229 |
| 2011/0258532 A1* | 10/2011 | Ceze et al. | 715/234 |

OTHER PUBLICATIONS

Zhang et al, "On the editing distance between unordered labeled trees", 1992.*

Zhang et al, "Approximate Tree Matching in the Presence of Variable Length Don't Cares", 1993.*

Derong Shen Ge Yu Gaoshang Sun;Method for extracting data of deepweb response webpage;CN101582074 Univ Northeastern;;ISR and WO.

Rong Chen Yinrui Guo Yaqing Li;Web information extraction system;CN101582075 Univ Dalian Oceanography;;ISR and WO.

* cited by examiner (a)        (b)

US 8,667,015 B2

DATA EXTRACTION METHOD, COMPUTER PROGRAM PRODUCT AND SYSTEM

BACKGROUND OF THE INVENTION

Information retrieval from the Internet can be an arduous task because of the immense volume of available data. A specific type of information retrieval is the retrieval of corresponding data from a plurality of target web pages. An example of such corresponding data is a data set including name, image and price of a product for comparison purposes. Manual extraction of such information becomes unfeasible when a large number of target websites is to be considered.

For this reason, automated information retrieval is desirable. Many automated solutions use the structure of the target web pages to retrieve such data. For instance, search algorithms using the document object model representation of a website are well-known. An example of such an algorithm is XPath, which may be configured using screen scraping techniques, in which on-screen user-selected data in a source web page is converted into a set of extraction rules for the XPath algorithm to apply to target web pages.

However, such algorithms have limited usefulness for instance when considering so-called dynamic web pages. A dynamic web page may be a web page having data that is periodically updated, e.g. a share price monitoring web page, or a web page that is generated from a template using user-defined parameters. An example of such a web page is a product page of an online store, where the product page is generated from a backend database using a template and user input.

The problem with such dynamic pages is that small variations in the content may cause algorithms such as XPath to fail to recognize a path to a data node of interest in the DOM tree representation of the target web page. Such small variations may for instance include the presence of an attribute in the DOM tree of a source web page from which the extraction rules are created that is absent in the target web pages, thus causing failure of the algorithm to recognize the match between the branches of source and target. Alternative solutions include extraction algorithms based on machine learning techniques, but this requires machine learning experts to design customized machine models, which is expensive. In addition, the accuracy of these solutions is often unsatisfactory, especially in business environments.

BRIEF DESCRIPTION OF THE EMBODIMENTS

Embodiments of the invention are described in more detail and by way of non-limiting examples with reference to the accompanying drawings, wherein FIG. 1 depicts DOM trees of example source and target web pages;

DETAILED DESCRIPTION OF THE DRAWINGS

Figure 1:
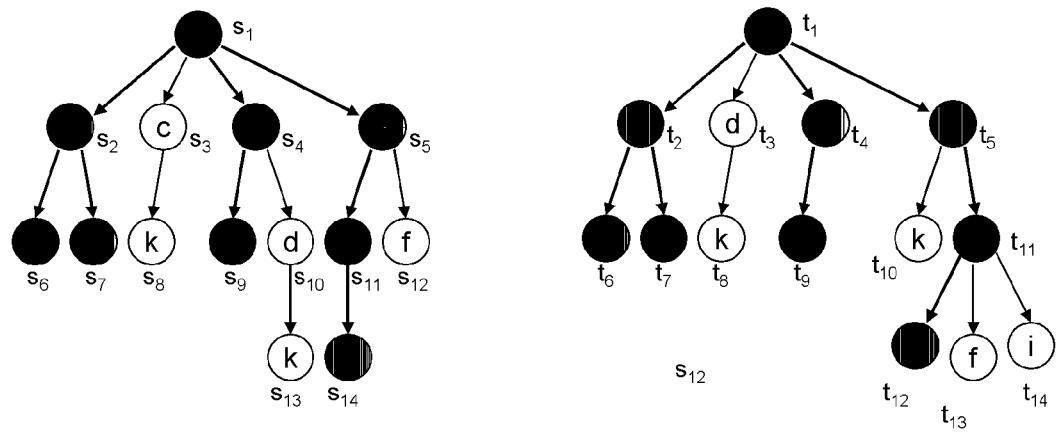

It should be understood that the Figures are merely schematic and are not drawn to scale. It should also be understood that the same reference numerals are used throughout the Figures to indicate the same or similar parts.

In an embodiment, the present invention provides a method for extracting information from a target web page by selecting data of interest in a source web page and trying to locate corresponding data in a target web page by determining similarities in the DOM tree representations of the source and target web page. The DOM tree of a source web page will also be referred to as a source DOM tree, and the DOM tree of a target web page will also be referred to as a target DOM tree. The principle of creating a DOM tree representation for a web page is well-known to the skilled person, such that this will not be explained in further detail for reasons of brevity only.

In the context of the present application, the following definitions will be used in the context of DOM trees. A root node is a node that may have children but does not have a parent. It is the top node in a DOM tree. A child node is a node that has a parent node. It may also have children of its own. A leaf node is a child node with a parent but no children of its own. It is a bottom node in a DOM tree. A path from a root node to a leaf node is called a full branch.

A matched path is a path from the root node to a leaf node that occurs in both the source DOM tree i.e. the DOM tree of the web page used as a template to identify the data of interest to a user, as well as in a target DOM tree. The respective matched paths of a pair of matched paths comprise the same nodes in the same order, i.e. connected by the same edges. An unmatched branch is a collection of interconnected paths that is unique to a DOM tree, e.g. the source or target DOM tree.

In an embodiment, the extraction method of the present invention partitions a set of DOM trees, preferably a pair of DOM trees, in matched paths and unmatched branches. A special instance of a matched path is the partition path, which borders, i.e. is the nearest neighbor, of an unmatched branch in the DOM tree. In this partition, each unmatched branch is bordered by one partition path if it is located at the edge of the DOM tree, or will be bordered on both sides by partition paths otherwise.

Typically, in a DOM tree, the information of interest to a user will reside in a leaf node, e.g. a text or image node. For this reason, an embodiment of the present invention will be explained for information in such leaf nodes although it should be understood that the inventive algorithm is equally applicable for information in intermediate nodes, i.e. nodes in a path between the root node and a leaf node.

This will be explained in more detail with the aid of FIG. 1, which depicts a source DOM tree $T_s$, with s=1-14, and a target DOM tree with $T_t$, with t=1-14. The letters inside the nodes indicate the node type. In accordance with an aspect of an embodiment of the present invention, the two DOM trees are matched using a (restricted) tree matching algorithm, which evaluates the similarity of two trees by producing a maximum matching through preorder traversal of the trees. The shaded nodes denote the matched nodes using this tree matching algorithm, i.e. the nodes that belong to a matched path. For instance, the path $s_1$-$s_2$-$s_7$ is matched to $t_1$-$t_2$-$t_7$ and the path $s_1$-$s_4$-$s_9$ is matched to $t_1$-$t_4$-$t_9$. In contrast, the path $s_1$-$s_3$-$s_8$ is unmatched. In accordance with an embodiment of the present invention, an unmatched branch is a sub-tree defined by all interconnected unmatched paths located in between two partition paths (or bordered by a single partition path when on the edge of a DOM tree).

Figure 2:
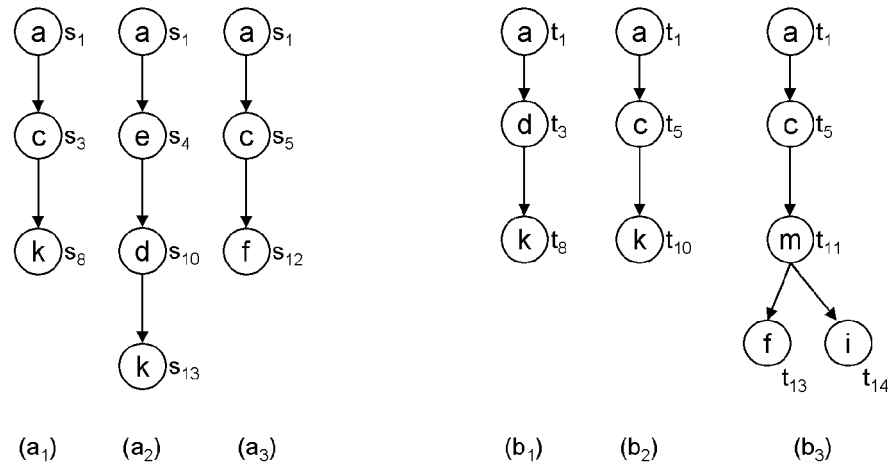
FIG. 2 depicts a DOM tree branch selection principle in accordance with an aspect of the present invention.

FIG. 2 depicts the unmatched branches $a_1$-$a_3$ and $b_1$-$b_3$ in the respective DOM trees of FIG. 1. As can be seen from $b_3$, a branch can contain multiple paths, i.e. $t_1$-$t_6$-$t_{11}$-$t_{13}$ and $t_1$-$t_6$-$t_{11}$-$t_{14}$ in $b_3$. The unmatched branch b3 is also an example of a branch bordered by a single partition path ($t_1$-$t_5$-$t_{11}$-$t_{12}$); all other unmatched branches in FIG. 2 are bordered by two partition paths.

It is important to realize that a partition path partitions a DOM tree into sub-trees, because an embodiment of the method of the present invention utilizes this property to limit the search for nodes of interest in the target DOM tree to a sub-tree formed by such a partition path, as will be explained in more detail with the aid of FIG. 3, which depicts a flowchart of a non-limiting example embodiment of such a method.

The method starts in step 302 with the user selecting information of interest on a source web page, and a number of target web pages from which corresponding information has to be extracted if present. In step 304 of the method, a target web page is selected and both the source and target web pages are converted into DOM tree representations as previously explained. In the source DOM tree, the user-selected information is identified, e.g. by means of the previously mentioned screen scraping techniques or in any other suitable manner. For instance, the information selection part of step 302 may be included in 304 with the user identifying nodes of interest of the source DOM tree. A simple tree matching algorithm is used to identify the matched paths in the DOM trees, as previously explained. In other words, this algorithm computes a template describing which parts of the two web pages are matched exactly and which parts are different. Nodes of interest belonging to matched paths will be referred to as 'template nodes' and nodes of interest belonging to unmatched branches will be referred to as 'non-template nodes'.

In next step 306, it is checked where the user-selected information resides in the source DOM tree. Two possible situations arise:
1. The identified (type of) information in the source DOM tree resides in a matched path.
2. The identified (type of) information in the source DOM tree resides in an unmatched branch.

If all information elements marked by the user correspond to matched nodes such as $s_6$ and $s_{14}$ in FIG. 1, then the data in nodes $t_6$ and $t_{12}$ may be directly extracted from target DOM tree $T_t$. In other words, the method may proceed to step 322, after which it is checked in step 324 if more target web pages need considering, in which case the method returns to step 304 or if all web pages have been considered, the method ends in step 326, preferably after presenting the user with the information extracted from the target webpages (not shown).

However, if at least some of the selected information resides in a node belonging to an unmatched branch of the source DOM tree, the problem is how to accurately extract mismatched nodes from the target tree.

The method then progresses to step 308, in which the source DOM tree is reduced into a sub-tree by identifying the nearest partition path(s) bordering the path to which the unmatched node containing the information of interest belongs, with the paths of the sub-tree defined by the identified partition path(s) being isolated as the unmatched branch, which comprises the node containing the information of interest.

At this point, it is important to realize that matched partition paths occur in both source and target DOM trees. Hence, the matched path(s) of the source DOM tree that have been identified as the relevant partition path(s) also exist in the target DOM tree, where these partition paths also define a sub-tree, i.e. an unmatched branch of the target DOM tree. This 'corresponding' unmatched branch in the target DOM tree is identified in step 310.

It is also important to understand that partition paths are very valuable in identifying the relative position of the non-template nodes and determining which sub-tree each non-template node belongs to. Whilst referring back to FIGS. 1 and 2, consider the following example. Suppose that the information in $s_8$ is marked by a user. Having produced the DOM tree partition for $T_s$ and $T_t$, $s_8$ is a non-template node found in the first partition of $T_s$. In accordance with an embodiment of the present invention, the search for a potentially matching node in $T_t$ is limited to the first partition of $T_t$ (i.e. unmatched branch b1) instead of considering the entire $T_t$ to find the target node. In other words, the location of the information of the target web page is taken into consideration, utilizing the property that comparable web pages tend to have large similarities in the way information is organized.

Based on this method, $t_8$ is the most likely candidate target node in $T_t$. In contrast, to e.g. absolute path searching methods used in some existing systems, which would identify $t_{10}$ to be the closest matching node. Hence, the present approach of DOM tree partitioning can avoid the selection of less appropriate nodes as is the case in existing systems due to the fact that the location of the information on the web page is taken into consideration. In addition, the fact that the present method only considers a truncated target DOM tree, i.e. a selected unmatched branch as will be explained in more detail below, the present method is more efficient in terms of required computational effort.

Next, it has to be decided whether or not a selected unmatched branch of the target DOM tree $T_t$ contains a candidate node that potentially contains the information of interest identified in the non-template node of the identified unmatched branch of the source DOM tree T. This is done in step 312, which will be explained in more detail with the aid of FIG. 4, in which a selected unmatched branch (a) of a source DOM tree and a selected unmatched branch (b) of a target DOM tree are depicted.

Figure 4:
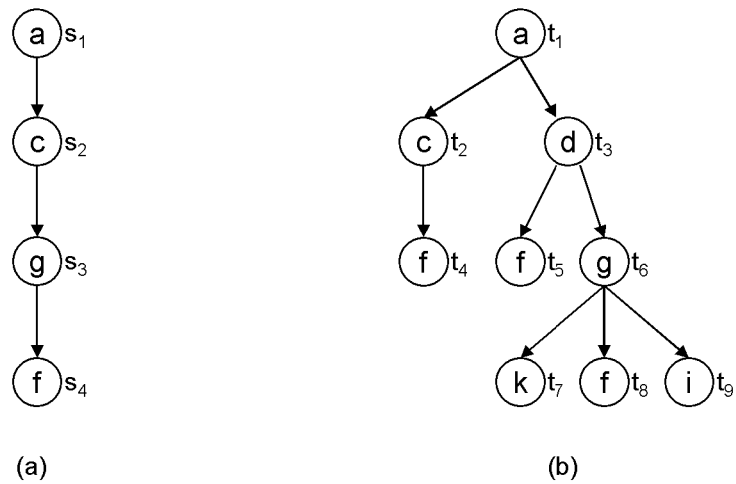
FIG. 4 depicts a partial path matching principle in accordance with another aspect of the present invention.

The overall process may be referred to as a partial path matching method, which is aimed at finding and extracting the target node with a minimal cost of aligning the path to which the target node belongs with the path in the source DOM tree unmatched branch containing the non-template node. In the following, it is assumed that the unmatched branches (a) and (b) in FIG. 4 are a pair of sub-trees resulting from the partitioning of a source and target DOM trees respectively, with $s_4$ being the non-template node containing the information marked by the user.

Firstly, a straightforward top-down path matching is performed from the root downwards on sub-tree (b) using the marked node path (a). This matching process is repeated layer by layer until a mismatch is occurred. Hence, this matching procedure yields an incomplete path from the root to the lowest matched node of (b).

Secondly, a bottom-up matching approach is applied, which assumes that the target node exists in the sub-tree rooted at the lowest matched node. In this approach, all leaf nodes under the lowest matched node are considered candidate leaf nodes if they are of the same type as the non-template node of the selected unmatched branch, i.e. sub-tree, of the source DOM tree, i.e. path (a) in FIG. 4. All other leaf nodes are removed. For example, all image leaf nodes are removed from the candidates, if the source element is a text node.

For each candidate leaf node, the cost of aligning the path in the source tree DOM to the non-template node comprising the information of interest and the full path of a candidate leaf node in the target DOM tree is calculated in step 314. A non-limiting example of a suitable cost function is the function costOfAlignment(path1, path2), which is used to compute the edit distance between two paths in the same manner the edit distance between two strings may be calculated. For instance, a unit cost of 1 may be assigned to the replacement, insertion, and removal operations for mapping two paths onto each other. This is explained in more detail with the aid of FIG. 4 (see below).

The comparison of the style features of nodes of the source path (a) and the target path (b) is ignored.

In other words, the mismatch between these two paths is quantified, and a candidate node may be selected in step 318 if it is determined in step 316 that the mismatch between the two paths does not exceed a predefined threshold, e.g. does not exceed a predefined cost. This may be repeated for all candidate nodes as indicated by step 320 after the information from the candidate node with the lowest alignment cost may be extracted in step 322.

In an embodiment, once all candidate leaf nodes of the lowest matching node have been considered, the lowest matching node is labelled as an unmatched node, and the next lowest matching node is identified, with the leaf nodes or the next lowest matching node subsequently being considered as previously explained. This approach is repeated until the root node $t_1$ of branch (b) is identified and processed as the lowest matched node. Subsequently, in step 322, the path to the candidate node in (b) is identified for which its alignment cost is minimal and less than a predefined threshold value.

For example, let us consider the sub-trees of FIG. 4 and assume that the user has identified the leaf node $s_4$ in the source DOM tree as the node of interest.

In the initial top-down matching step, it is recognized that $s_1$ matches $t_1$, $s_2$ matches $t_2$ but that $s_3$ does not match $t_4$. Hence, it is concluded that $t_2$ is the lowest matched node in target DOM tree $T_t$. The lowest matched node $t_2$ has a single candidate leaf node is $t_4$, which is a potentially suitable candidate because $t_4$ is of the same type ('f') as $s_4$. In other words, $t_1t_2t_4$ is a candidate path. A cost of aligning the candidate path $t_1t_2t_4$ (having nodes of type acf) with the source path $s_1s_2s_3s_4$ (having nodes of type acgf) is calculated, for instance by using the aforementioned cost function CostofAlignment (a, b) for paths (a) and (b) in FIG. 4.

At this point it is observed that although $s_2$ matches $t_2$, it is still possible that there is another path in (b) that does not have a direct match for $s_2$ but has a lower overall alignment cost. For this reason, in an embodiment, the method proceeds to the next iteration in which $t_2$ will be labelled an unmatched node, such that the next matched node in the unmatched branch (b) of the target DOM tree may be identified. In an embodiment, prior to finding the next matched node in the sub-tree (b), the cost of aligning unmatched node $t_2$ is calculated. This is based on the insight that increased mismatching, or at least a mismatch in a path occurring closer to the root node of the path will cause a higher matching cost for aligning a target path to a source path. The cost may be computed according to the edit distance of paths, as previously explained.

If this cost less than the threshold, the method continues by changing the current lowest matched node to the next lowest matched node, i.e. t1 in FIG. 4. All candidate leaf nodes of t1 that are not also below t2 are considered, i.e. t5, t7, t8 and t9 in FIG. 4. From these candidate nodes, t5 and t8 are selected for alignment cost calculation because their tags correspond to the tag of the annotated node s4. In a next step, the alignment cost of paths t1t3t5 and t1t3t6t8 is computed. In the present example, this ends the iterative process of selecting candidate paths by the bottom-up selection process of lowest matched nodes because t1 is the root node.

Comparing the cost of aligning the source path $s_1s_2s_3s_4$ with each of the target paths, $t_1t_2t_4$, $t_1t_3t_5$ and $t_1t_3t_6t_8$, the target path with the minimal alignment cost is selected. In the example of FIG. 4, the cost of alignment the source path with these three candidate target paths is 1, 2 and 1 respectively. Hence, node $t_4$ will be selected as the target element because it is a matching element belonging to a target path with a minimal alignment cost.

The main advantages of this partial path matching approach lie in the aforementioned combination of a top-down matching and a bottom-up matching strategy, which can help improve accuracy as well as efficiency as previously explained. Based on the assumption that the target node most frequently exists in the sub-tree rooted at the lowest matched node, this method ensures that in most cases the relatively low-cost paths will be processed earlier than the paths with a relatively high-cost. Consequently, the matching process may be terminated as soon as a path alignment cost caused by aligning its mismatched nodes exceeds a predefined threshold value. This further improves the efficiency of the method because no paths are considered for which it is predicted that the alignment cost must exceed the aforementioned threshold.

In an embodiment, for dealing with a scenario in which a target DOM tree contains degenerate lowest matching nodes, i.e. more than one lowest matching node at the same level of the tree, the method comprises an additional step of listing all degenerate lowest matching nodes and performing the bottom-up matching for each lowest matching node, and calculating path costs and next lowest matching nodes for each of these lowest matching nodes as explained above.

Figure 3:
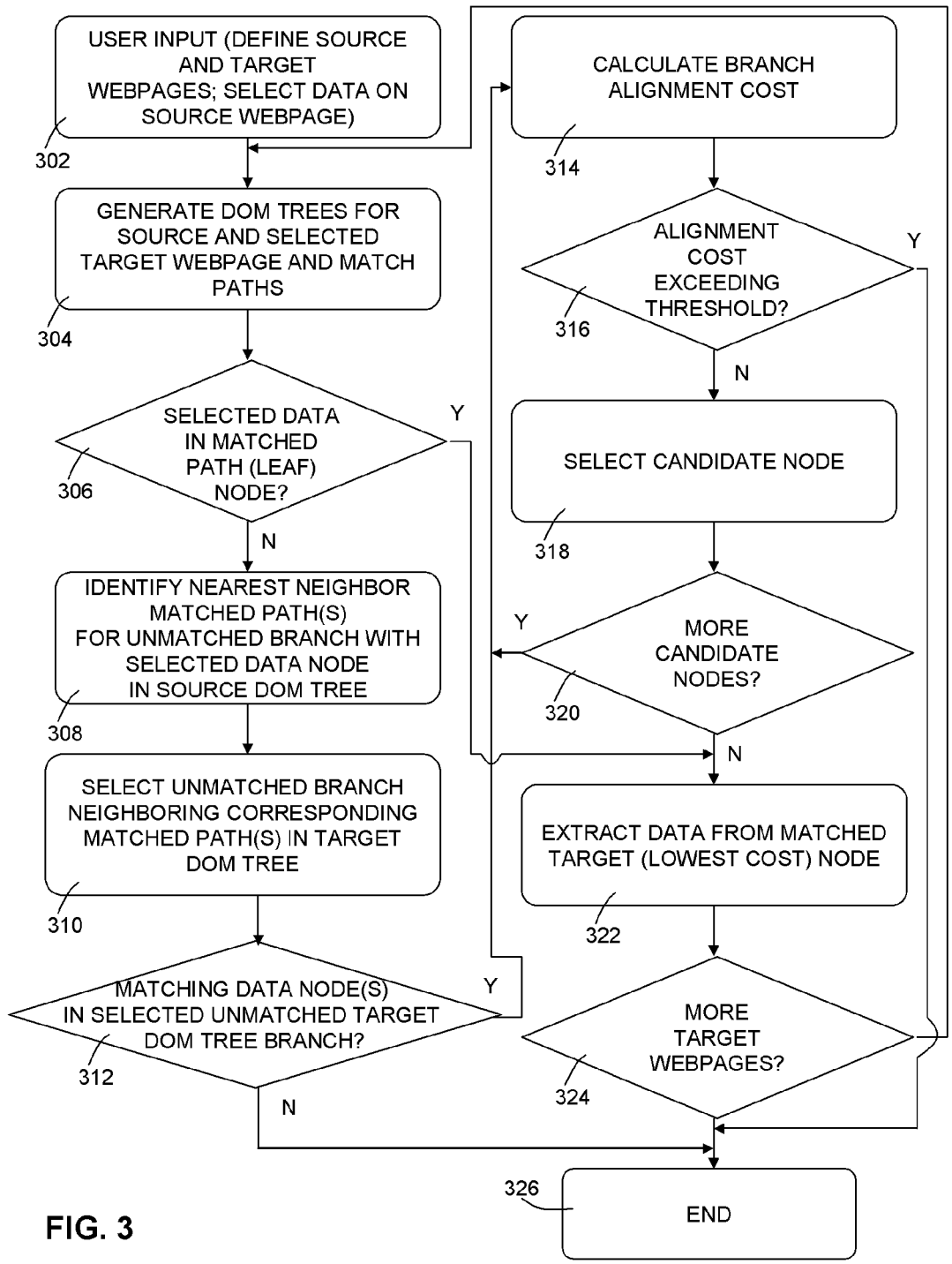
FIG. 3 depicts a flow chart of a data extraction method in accordance with an embodiment of the present invention.

As indicated in FIG. 3, the method may revert to step 304 if it is decided in step 324 that not all target web pages have yet been evaluated. Otherwise, the method may end in step 326 as previously explained.

So far, the extraction of information from a single target web page has been described. However, it should be appreciated that in many real applications, the objective may be to extract content from a large set of similar web pages. In the embodiment shown in FIG. 3, these web pages are being processed one at a time, as indicated by step 326. In a further embodiment, once the content has extracted successfully from a target web page, the extraction results are added to a rule database already containing the source DOM tree, for use as extraction rules to assist content extraction from subsequent target web pages. For instance, the thus defined extraction rules may comprise defining a set of DOM trees including the DOM tree of the source web page and truncated DOM trees of already processed target web pages, said truncated trees comprising all matched paths and all unmatched branches comprising a data node for which the alignment cost does not exceed the predefined threshold.

When using these extraction rules, data residing in a node of a path of a subsequent target web page DOM tree that matches a template node in a matched path of the source web page DOM tree or a non-template node in one of the truncated target web page DOM trees in the extraction rules may be directly extracted without having to calculate the alignment cost of the path to which the candidate node belongs. This approach provides this method with learning ability, which improves both the efficiency and accuracy of the data extraction.

Embodiments of the method present invention may be captured in a computer program product for execution on the processor of a computer, e.g. a personal computer or a network server, where the computer program product, if executed on the computer, causes the computer to implement the steps of the method, e.g. the steps as shown in FIG. 3. Since implementation of these steps into a computer program product requires routine skill only for a skilled person, such an implementation will not be discussed in further detail for reasons of brevity only.

In an embodiment, the computer program product is stored on a computer-readable medium. Any suitable computer-readable medium, e.g. a CD-ROM, DVD, USB stick, Internet-accessible data repository, and so on, may be considered.

Figure 5:
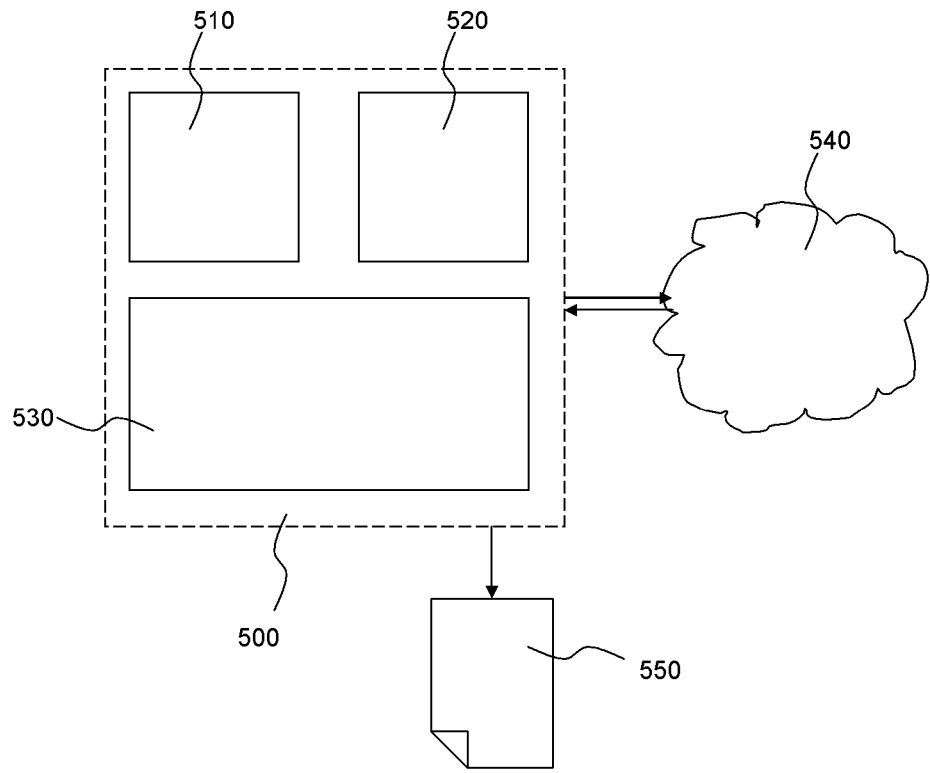
FIG. 5 schematically depicts a system in accordance with an embodiment of the present invention.

In an embodiment, the computer program product may be included in a system, such as a system 500 shown in FIG. 5. The system 500 comprises a user annotation module 510, which allows a user to tell the system 500 what information he wants the system 500 to monitor and extract. The information selection may be achieved e.g. by pointing a mouse (not shown) at an item of interest, e.g. a text passage or image, on a source web page, or tagging the item of interest. The system 500 is configured to generate and store corresponding extraction rules for extracting corresponding information from target web pages.

The system 500 further comprises a web page download/crawling module 520, which is another user interface. The user annotation module 510 is responsible for collecting the information of interest to the user, whereas the a web page download/crawling module 520 is responsible for collecting the target web pages from which user wants to extract information, and for downloading the webpages from the Internet 540 for post-processing. In an embodiment, the user annotation module 510 and the web page download/crawling module 520 may be combined into a single module, or may be distributed over more than two modules.

The system 500 further comprises an information extraction module 540, which comprises the part of the aforementioned computer program product that is responsible for the identification of the matched paths and unmatched branches and the subsequent extraction of information of interest as explained above. The system 500 further comprises a result aggregation module 550 for aggregating the extracted information and presenting this information to the user or subsequent applications in any suitable form, e.g. digitally or in text form, e.g. on a computer screen or as a print-out.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of automatically extracting data from a target web page, comprising:
   selecting data in a source web page;
   determining respective DOM (document object model) trees of the source and target web pages, and identifying one or more nodes comprising the selected data in the source web page DOM tree;
   determining matching paths in the respective DOM trees;
   for selected data in a node of an unmatched branch of the source web page DOM tree, identifying the nearest matched path in the source web page;
   identifying the unmatched branch nearest to the corresponding matched path in the target web page DOM tree, wherein the corresponding matched path is a partition path;
   determining if said identified unmatched branch in the target web page DOM tree comprises a target node matching the selected data node; and if so:
   extracting data from the target node if the mismatch between the respective unmatched branches does not exceed a predefined threshold.

2. The method of claim 1, further comprising for a target node in a path of the target web page DOM tree matching the selected data node in the matched path of the source web page DOM tree, extracting the data from said target node.

3. The method of claim 1, wherein identifying the nearest matched path in the source web page comprises determining neighboring paths on either side of the unmatched branch, and wherein identifying the unmatched branch nearest to the corresponding matched path in the target web page comprises identifying the unmatched branch in between the corresponding matched neighboring branches of the target web page DOM tree.

4. The method of claim 1, wherein the step of extracting said matched data if the mismatch between the respective unmatched branches does not exceed the predefined threshold comprises calculating cost as a function of aligning the selected unmatched branch of the target web page with the selected unmatched branch of the source web page, and comparing the calculated cost to said threshold.

5. The method of claim 4, further comprising:
   defining extraction rules based on the unmatched branch of the target website DOM tree comprising a data node matching the selected data node and having an alignment cost not exceeding the predefined threshold; and
   using said extraction rules in extracting data from subsequent target web pages.

6. The method of claim 5, wherein:
   defining said extracting rules comprises defining a set of DOM trees including the DOM tree of the source web page and a truncated DOM tree of the target web page, said truncated tree comprising all matched paths and all unmatched branches comprising a data node for which the alignment cost does not exceed the predefined threshold; and
   using said extraction rules comprises, for data residing in a node of a path of a subsequent target web page DOM tree matching the node in the matched path of the source web page DOM tree or the truncated target web page DOM tree, extracting said data.

7. The method of claim 1, further comprising selecting a plurality of target web pages, and, for each target web page, repeating the steps of:
   determining the DOM tree representation of the target web page;
   determining matching paths in the respective DOM trees; and
   for selected data in a node of an unmatched branch of the source web page DOM tree:
   selecting the nearest matched path in the source web page;
   identifying the unmatched branch nearest to the corresponding matched path in the target web page;
   determining if said identified unmatched branch comprises a node matching the selected data node; and
   extracting said matched data if the mismatch between the respective unmatched branches is less than a predefined threshold for each of the target web pages.

8. The method of claim 1, further comprising presenting the extracted data to a user.

9. A method of automatically extracting data from a target web page, comprising:
- selecting data in a source web page;
- determining respective DOM (document object model) trees of the source and target web pages, and identifying one or more nodes comprising the selected data in the source web page DOM tree;
- determining matching paths in the respective DOM trees;
- for selected data in a node of an unmatched branch of the source web page DOM tree, identifying the nearest matched path in the source web page;
- identifying the unmatched branch nearest to the corresponding matched path in the target web page DOM tree, wherein the corresponding matched path is a partition path;
- determining if said identified unmatched branch in the target web page DOM tree comprises a target node matching the selected data node; and if so:
- extracting matched data from the target node if the mismatch between the respective unmatched branches does not exceed a predefined threshold,
- wherein the step of extracting said matched data if the mismatch between the respective unmatched branches does not exceed the predefined threshold comprises calculating cost as a function of aligning the identified unmatched branch of the target web page with the identified unmatched branch of the source web page, and comparing the calculated cost to said threshold,
- wherein the step of determining if said identified unmatched branch comprises a node matching the selected data node comprises:
- comparing said unmatched branches to find the lowest matching node in the unmatched branch of the target web page; and
- for child nodes of said lowest matching node, checking if said child node corresponds to the selected data node, and if so, calculating the cost for aligning the branch from the root node to said child node in the target web page DOM tree with the branch from the root node to the selected data node in the source web page DOM tree; and
- wherein the extracting said matched data if the mismatch between the respective unmatched branches does not exceed the predefined threshold comprises selecting the corresponding child node with the lowest cost.

10. The method of claim 9, wherein the child nodes are leaf nodes.

11. The method of claim 9, further comprising:
- labeling the lowest matching node as an unmatched node upon completion of said calculating the cost for aligning, and repeating said comparing step to find the next lowest matching node, and
- for child nodes of said next lowest matching node, checking if said child node corresponds to the selected data node, and if so, calculating the cost for aligning the branch from the root node to said child node in the target web page DOM tree with the branch from the root node to the selected data node in the source web page DOM tree;
- and wherein the step of selecting the corresponding child node with the lowest cost comprises selecting said child node from the child nodes of the lowest matching node and the next lowest matching node.

12. The method of claim 11, wherein the steps of labeling the lowest matching node as an unmatched node and, for child nodes of said next lowest matching node, checking if said child node corresponds to the selected data node, and if so, calculating the cost for aligning the branch from the root node to said child node in the target web page DOM tree with the branch from the root node to the selected data node in the source web page DOM tree are repeated until a cost exceeding the predefined threshold has been calculated.

13. A non-transitory computer-readable medium comprising computer program code that upon execution by a computer cause the computer to:
- select data in a source web page;
- determine respective DOM (document object model) trees of the source web page and a target web page, and identifying one or more nodes comprising the selected data in the source web page DOM tree;
- determine matching paths in the respective DOM trees;
- for selected data in a node of an unmatched branch of the source web page DOM tree, identify the nearest matched path in the source web page;
- identify the unmatched branch nearest to the corresponding matched path in the target web page DOM tree, wherein the corresponding matched path is a partition path;
- determine if said identified unmatched branch in the target web page DOM tree comprises a target node matching the selected data node; and if so:
- extract data from the target node if the mismatch between the respective unmatched branches does not exceed a predefined threshold.

14. A system comprising a computer and a non-transitory computer-readable medium comprising computer program code executable by the computer to:
- select data in a source web page;
- determine respective DOM (document object model) trees of the source web page and a target web page, and identifying one or more nodes comprising the selected data in the source web page DOM tree;
- determine matching paths in the respective DOM trees;
- for selected data in a node of an unmatched branch of the source web page DOM tree, identify the nearest matched path in the source web page;
- identify the unmatched branch nearest to the corresponding matched path in the target web page DOM tree, wherein the corresponding matched path is a partition path;
- determine if said identified unmatched branch in the target web page DOM tree comprises a target node matching the selected data node; and if so:
- extract data from the target node if the mismatch between the respective unmatched branches does not exceed a predefined threshold.

* * * * *

UNITED STATES PATENT AND TRADEMARK OFFICE
CERTIFICATE OF CORRECTION

PATENT NO. : 8,667,015 B2  
APPLICATION NO. : 13/258480  
DATED : March 4, 2014  
INVENTOR(S) : Li-Mei Jiao et al.

Page 1 of 1

It is certified that error appears in the above-identified patent and that said Letters Patent is hereby corrected as shown below:

In the Specification

In column 5, line 1, after "manner" insert -- as --.

Signed and Sealed this  
Twenty-fourth Day of June, 2014

Michelle K. Lee  
*Deputy Director of the United States Patent and Trademark Office*